United States Patent [19]
Bramnick et al.

[11] Patent Number: 6,058,169
[45] Date of Patent: May 2, 2000

[54] SELECTIVE FAX ROUTING THROUGH THE INTERNET

[75] Inventors: Arnold H. Bramnick, Boca Raton; James M. Dunn, Ocean Ridge, both of Fla.

[73] Assignee: International Business Machines Corporation, Armonk, N.Y.

[21] Appl. No.: 08/907,803

[22] Filed: Aug. 8, 1997

[51] Int. Cl.[7] .................................................. H04M 11/00
[52] U.S. Cl. ............................... 379/100.01; 379/100.09; 358/407
[58] Field of Search ......................... 379/100.01, 100.12, 379/100.09; 358/407, 468

[56] References Cited

U.S. PATENT DOCUMENTS

| | | | |
|---|---|---|---|
| 4,922,348 | 5/1990 | Gillon et al. | 379/100.09 |
| 4,941,170 | 7/1990 | Herbst | 379/100 |
| 5,091,790 | 2/1992 | Silverberg | 358/434 |
| 5,406,557 | 4/1995 | Baudoin | 370/61 |
| 5,467,390 | 11/1995 | Brankley et al. | 379/229 |
| 5,479,411 | 12/1995 | Klein | 370/110.1 |
| 5,499,109 | 3/1996 | Mathur et al. | 358/400 |
| 5,513,126 | 4/1996 | Harkins et al. | 364/514 |
| 5,739,919 | 4/1998 | Lee et al. | 379/100.01 |
| 5,862,202 | 1/1999 | Bashoura et al. | 379/100.14 |

FOREIGN PATENT DOCUMENTS

WO96/20553  7/1996  Canada ........................ H04M 3/50

OTHER PUBLICATIONS

WO 97/10668: Internet Facsimile System, Mar. 20, 1997.
SNA Network Fax Gateway Conversions and Routing, vol. 33, No. 11, Apr. 1991.

*Primary Examiner*—Paul Loomis
*Assistant Examiner*—Melur Ramakrishnaiah
*Attorney, Agent, or Firm*—Robert Lieber; Richard A. Tomlin

[57] ABSTRACT

A newly defined facsimile (fax) handling service, to be performed by carriers in the public switched telephone network (PSTN) on calls originating from standard analog fax sending equipment, includes: a) intercepting and recording direct dialed digits, representing final destinations of such calls, at PSTN switching nodes in areas local to respective call origins; b) returning acknowledgements from these nodes to respective callers in the form of fax tones corresponding to those usually returned by standard analog fax receiving equipment; c) locally intercepting and recording signals representing the fax image information intended for delivery to the called destinations; d) returning a completion signal indication to the originating equipment; and e) offline to the originating equipment, managing the delivery of the recorded image information to the final destinations represented by the recorded call digits.

11 Claims, 7 Drawing Sheets

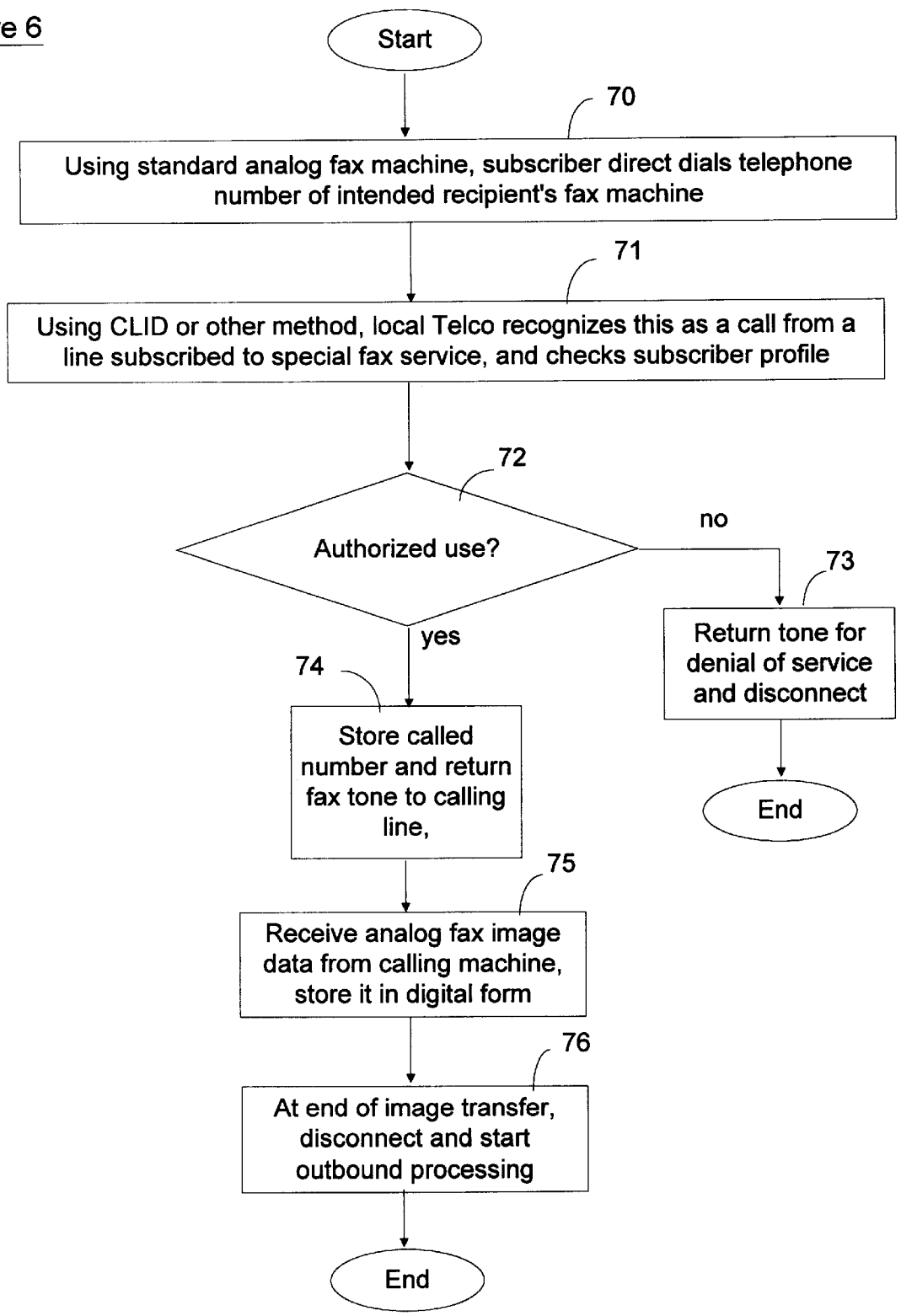

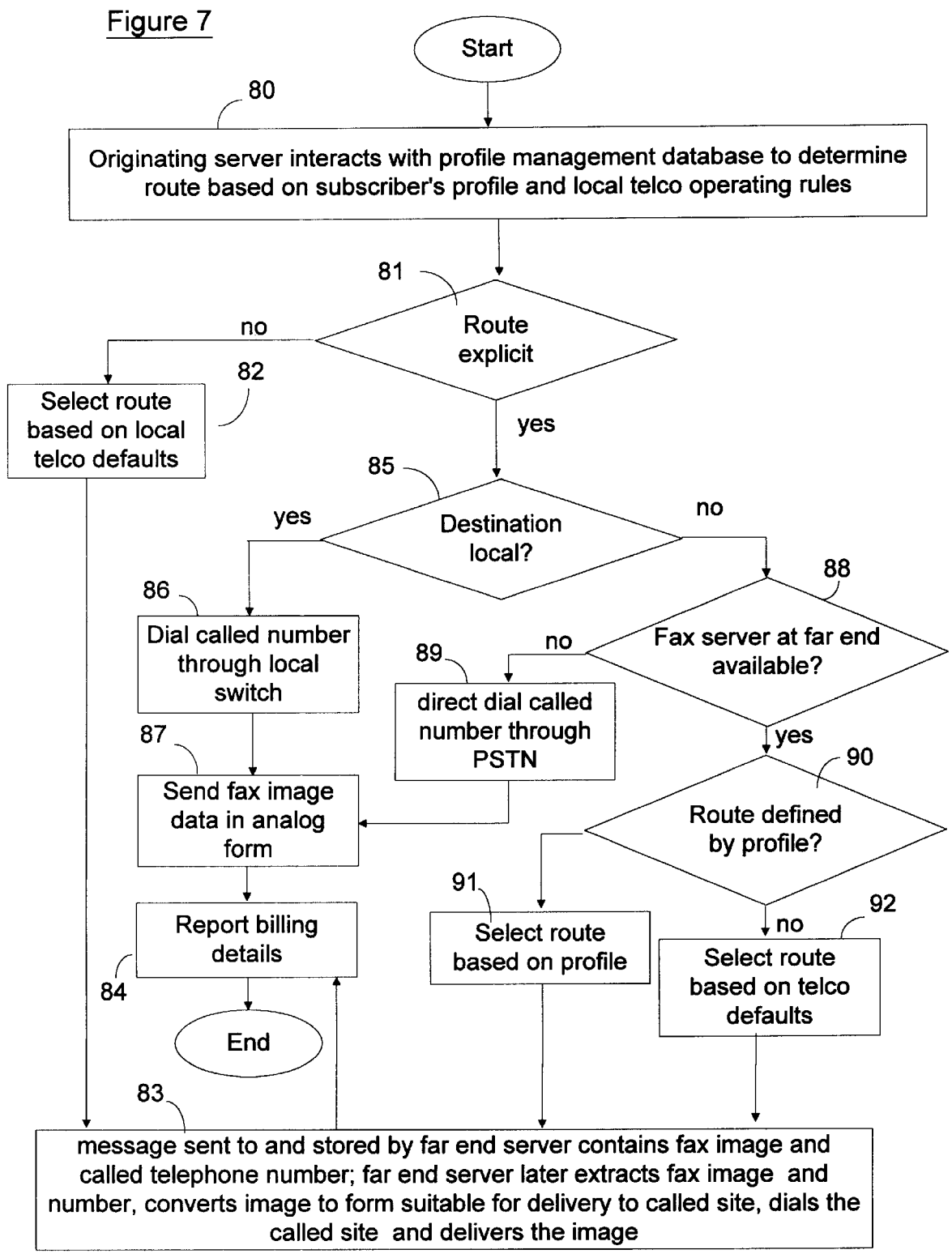

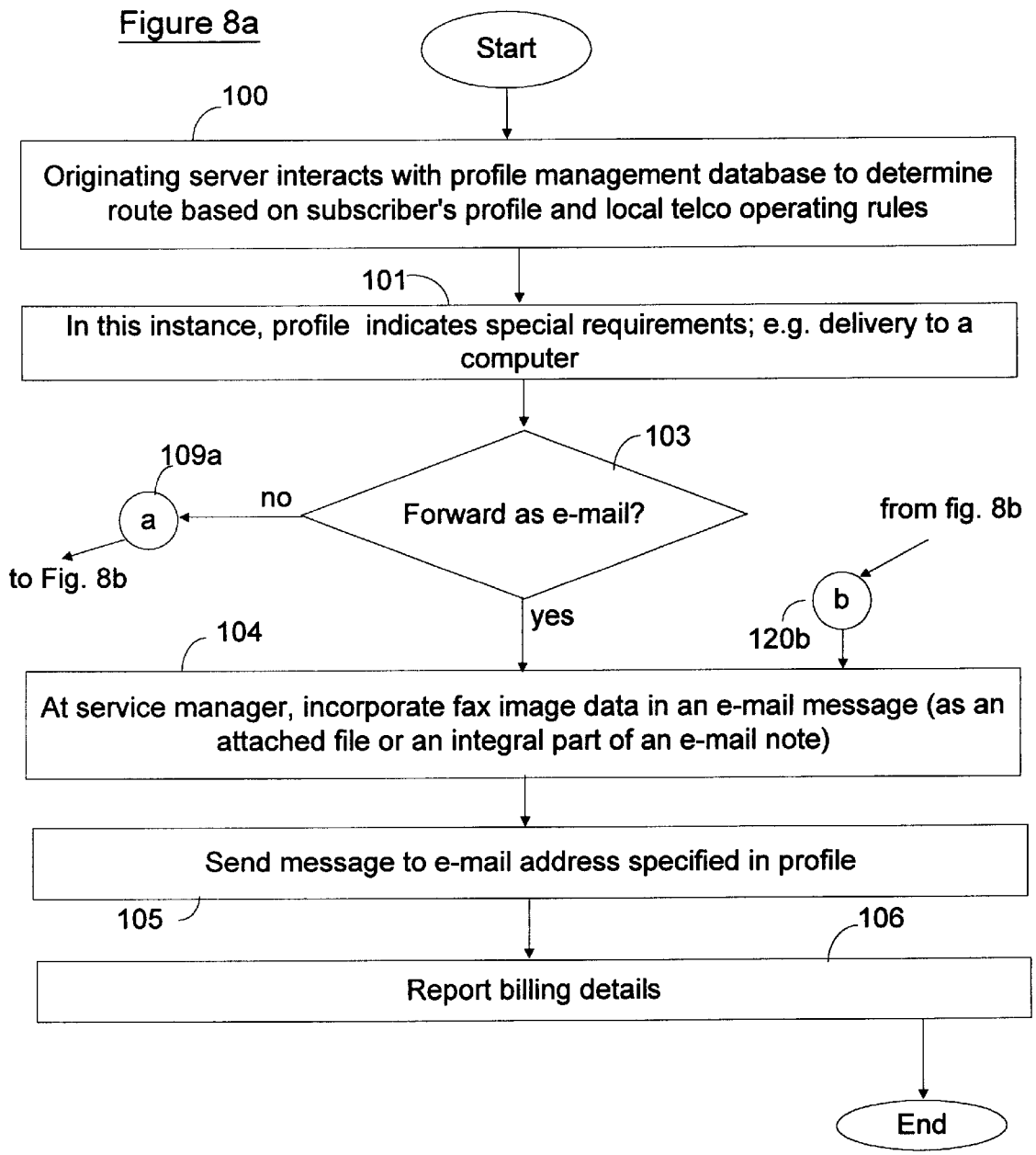

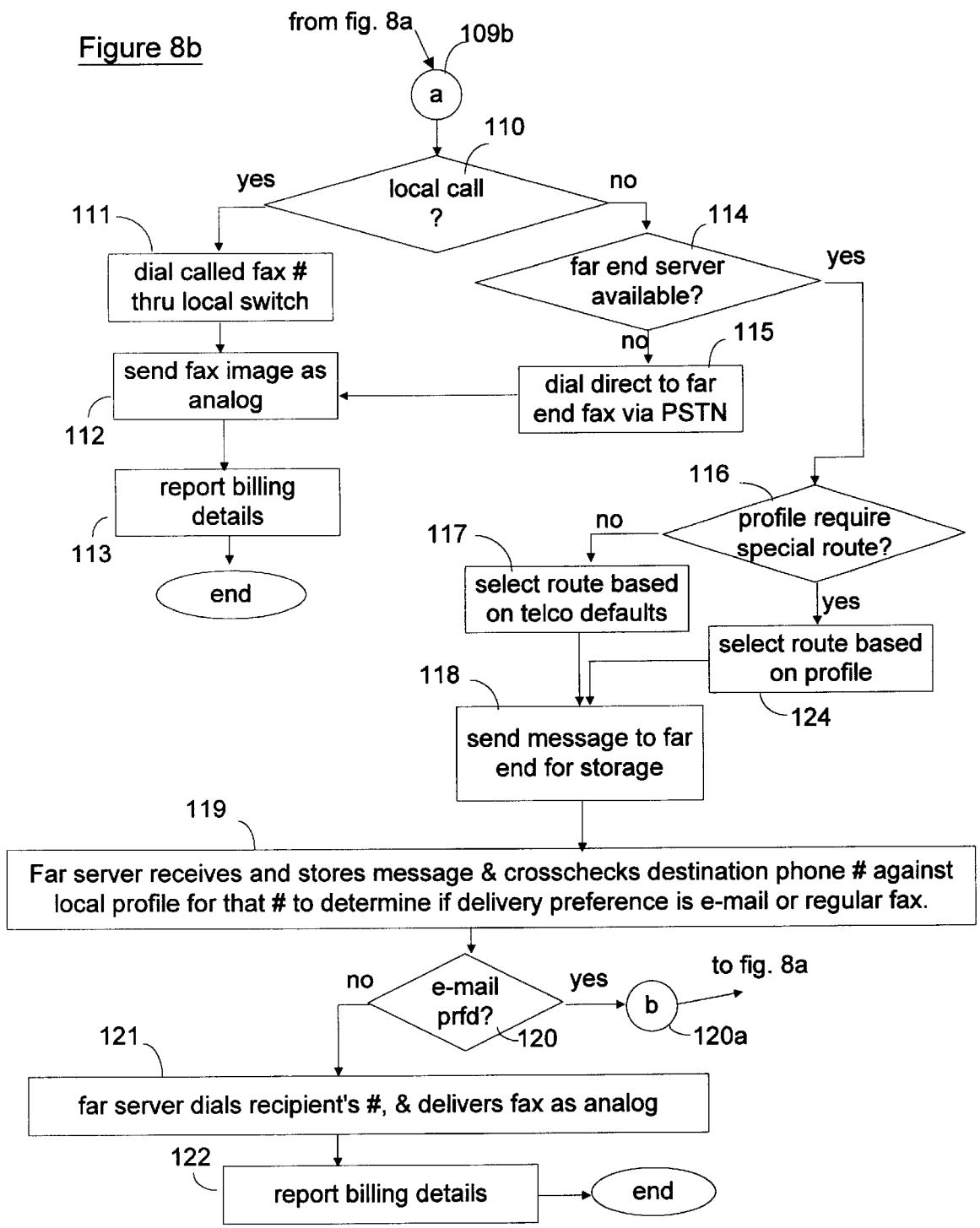

SELECTIVE FAX ROUTING THROUGH THE INTERNET

CROSS-REFERENCES TO RELATED APPLICATIONS

1) Patent application Ser. No. 08/792,018, filed Feb. 3, 1997 by D. A. Acker et al and titled MULTISERVICE PLATFORM ARCHITECTURE FOR TELEPHONE NETWORKS, discloses an intelligent peripheral (IP) computer-based system for telephone networks; particularly, telephone networks that are part of the public switched telephone network (PSTN) through which most telephone calls are handled today. This IP system represents a preferred mechanism for efficient implementation of the present invention.

2) Patent application Ser. No. 08/803,407, filed Feb. 20, 1997 by B. D. Mandalia et al and titled MULTIMEDIA WEB PAGE APPLICATIONS FOR AIN TELEPHONY, discloses an application designed for use in an IP system of the type disclosed in the foregoing patent application by D. L. Acker et al. This application manages distribution of facsimile (fax) materials through public data networks external to the PSTN; e.g. the Internet. This is distinguished from the present subject matter in that: a) it requires users to dial (or tone key) special numbers connecting to regional IP systems, where the system presently contemplated allows users to direct dial actual destinations of their fax transmissions; and b) it is limited to transfers from the PSTN to destinations on an external public data network, whereas the present system is designed specifically to permit transfers to destinations that are either in the PSTN or an external data network.

BACKGROUND OF THE INVENTION

Presently, analog facsimile (fax) information is transmitted over the public switched telephone network (PSTN), where the connections are formed just like voice connections, by direct dialing (or tone keying) of a called (or receiving or destination) site from a sending (or originating) site. Typically, the entire connection route is internal to the PSTN. Upon establishment of a connection, the sending site sends signals representing facsimile image information to the receiving site.

Problems with this are: 1) for the PSTN customer, fax transfers to busy or intermittently faulty destinations can be difficult to complete, and transfers to remote destinations can be costly (especially transfers of fax images of bulky documents); 2) for PSTN carriers managing such transfers, revenues can be small in relation to the service being provided, taking into account repeated handling of calls to busy destinations.

SUMMARY OF THE INVENTION

Our proposed solution is to have the PSTN provide an enhanced fax transfer service in which: a) calls utilizing this service are direct dialed to intended destinations in standard fashion, but intercepted locally by PSTN intelligence (for example, an IP system of the type described in the above-referenced patent application by Acker et al); b) the intercepting system provides the appearance to the originating site of an instantly formed connection to the destination, and enables the sending equipment to immediately execute transmission of the fax (image) intelligence as if to the destination, all regardless of the actual availability of the destination site while this is occurring (i.e. the sender never receives a "busy" signal following the direct dialing sequence, is immediately prompted by the telephone network to send the fax information, ultimately perceives that transmission as successfully concluded, and "hangs up"); c) the intercepting IP system locally records both the dialed destination and the fax image intelligence, and manages the transmission of that intelligence offline to the calling equipment; and d) the transmission route from the intercepting site to the destination can be either entirely internal to the PSTN or partly (or entirely) external.

The last-mentioned route selection feature can be based upon either a standard service default (e.g. for subscribers receiving only internal routing) or a pre-recorded database profile, of the subscriber at the calling site, allowing some calls to be handled internally and others externally. For external handling, the transmitted information is transferred to a PSTN fax server that interfaces between the intercepting system and the external data network, and transmits the information to that network in an appropriate form (e.g. for transfers over the Internet, transmits the information in a digital form suited to that network).

As noted above, subscriber profiles can allow for some fax transmissions of a subscriber to be sent over entirely internal PSTN routes and other fax transmissions of the same subscriber to be sent over external data networks. Thus, for instance, a subscriber's fax transmissions to local destinations could be handled internally and fax transmissions to remote destinations could be sent externally.

Another feature of the invention is that transmissions routed externally can be delivered to destination sites from either the external network or the PSTN. For example, calls externally routed through the Internet could be delivered either to a computer connected to the Internet or to a conventional analog fax receiver connected to the PSTN.

Furthermore, a fax call to a long distance destination, under this service, could be routed over a data network internal to the PSTN, between call management systems local to the calling and called equipment. Such internal data network can extend either through a digital telephone trunk reached through standard switch nodes in the PSTN or through a local or wide area network (LAN or WAN) over which administrative data is transferred between processing centers of the PSTN.

Furthermore, connection to a dialed destination, of a call using the present service, can be accomplished in various ways. For example, connections to standard analog receivers could be initiated by presentation of standard ringing signals to respective receiving sites, and connections to computers using the Internet could be initiated by presentation of control signals to respective computers indicating that a fax transmission is pending. For the connections to computers with Internet access, the connections can be made in real-time, while a receiving computer is online and performing other communications, or they can be handled like today's email with an indication to a receiving system that is not online when the call is dialed that a fax communication is pending like e-mail.

A feature of the invention is that the route chosen for delivery to the final destination can be selected on the basis of service parameters agreed to by calling users of the service; e.g. an agreement to have all fax calls from a given subscribing site to local destinations routed only through internal transmission facilities of the PSTN, fax calls from the same site to certain remote destinations routed only through an external network like the Internet, and other fax calls from that site to certain other remote destinations routed only through internal networks of the PSTN.

Another feature of the invention is that it is capable of serving existing standard/analog fax equipment at both sending and receiving sites, through existing telephone numbers, so as to maximize convenience to users and effectively minimize complexity of handling within the PSTN.

Another feature of the invention is that operations providing functions associated with the present service can be implemented by existing and/or yet to be developed switch management systems, which systems may but needn't necessarily conform to presently well-known principles of Advanced Intelligent Network (AIN) architecture.[1]

[1]Intelligent Networks: IN/AIN Technologies, Operations, Services and Applications, February 1996 (book, 382 pages, based on findings of the International Engineering Consortium; accessible on the Internet at http://www.lec.org/index.htm)

Advantages of such services to sending users are: a) over the long term, costs of the service may be less than comparable costs of standard handling; and b) such users need not be bothered with having to repeat either calls to busy destinations or calls aborted prematurely due to faulty operations in the telephone network (since such conditions are easily detected by and repeated by network intelligence without participation of originating callers or their equipment).

Advantages of these services to PSTN carriers are: a) fax communications under the subject service could be handled more efficiently than standard telephone fax communications, since the information to be delivered can be recorded in digital form at PSTN nodes local to senders (and potentially stored in compressed form for enhanced usage of storage), sent in digital form between sending and receiving nodes (e.g. over digital trunks available within the PSTN, and e.g. in compressed form providing enhanced usage of PSTN transmission facilities), and delivered in analog form at destinations; b) revenues for the services would be additional to revenues realized presently from standard handling of local fax transmissions; and c) use of external data network routes would effectively reduce traffic within parts of the PSTN bypassed by such usage, effectively permitting bypassed parts of the PSTN to carry additional standard telephone traffic.

For outbound fax communications, the presently proposed service would utilize a system comprising: a) means for detecting that a locally originating call is a fax communication subject to the proposed service; b) means responsive to detection that a locally originating call is subject to the proposed service for intercepting and recording the destination number out-dialed by the originating equipment, and returning a tone to that equipment corresponding to the tone normally returned upon connection to a (direct-dialed) destination, said returned tone serving to condition the calling equipment to immediately begin transmitting information representing fax images to be delivered to the dialed destination; c) means for receiving and digitally recording the image information sent by the calling equipment in response to the returned tone; d) means for returning a completion indication to the calling equipment as if the information sent by said calling equipment had actually been successfully delivered to the called destination; and e) means operating off-line to the calling equipment for managing delivery of the recorded image information to the call destination represented by the recorded destination number.

For inbound fax communications subject to the proposed service, PSTN nodes receiving such communications for local delivery to receiving equipment should have systems comprising: a) means for detecting that an incoming communication is subject to the proposed service; b) means responsive to such detection for receiving and digitally recording the information representing both the called destination number and the fax image intelligence to be delivered to equipment associated with that number; and c) means for managing delivery of the fax image intelligence to the associated equipment independently of components of the PSTN that are not directly involved in such delivery.

Certain of the foregoing "means" are subject to various implementation options.

For example, at a sending site, detection that a communication is subject to the presently proposed service can be accomplished very simply if the call originates on a telephone line dedicated exclusively to the proposed service. For calls originating on other lines, the calling equipment would be required to send special tones or signals distinguishing the call as subject to the proposed service[2]. At nodes local to called destinations, calls subject to the proposed service would be distinguished by information transmitted from PSTN nodes local to callers.

[2]An example of how this can be done is found in the IBM Technical Disclosure Bulletin, Vol. 38 #10 (October 1995, pages 389–390, M. Bhuta et al, Detecting Incoming Voice, Data of Fax Telephone Calls), Management of delivery from a PSTN node local to calling equipment to a PSTN node local to called equipment is subject to implementation variations. Some calls subject to the proposed service will be routed exclusively through internal facilities of the PSTN, and other calls subject to the same service will be routed in part through the PSTN and in part through data networks external to the PSTN (e.g. the Internet). For example, all calls to local destinations could be handled internal to the PSTN and some calls to remote (long distance) destinations could be handled either internal to the PSTN or over the external network, depending upon subscribed parameters of the proposed service (e.g. distance calls requiring "express" time handling might be routed through internal data channels or trunks of the PSTN and other distance calls could be routed through the external data network).

At destination nodes, management of delivery under the proposed service could be handled by dialing the called number, establishing a standard analog connection to fax equipment at that number, and delivering the recorded fax image information to the connected equipment. Optionally, for customers explicitly requesting it, the recorded fax image can be delivered in digital form, through the external data network, to a modem and computer at the destination; e.g. as e-mail or "browsable" Internet pages.

At interfaces between the PSTN and external data networks such as the Internet, fax servers maintained by the PSTN would be adapted to perform the communication functions required by the proposed service.

The foregoing and other features, aspects, advantages and benefits ot the invention will be more fully understood and appreciated from the description and claims to follow.

BRIEF DESCRIPTION OF THE DRAWINGS

FIG. 6 is a flowchart for explaining operations performed by PSTN intelligence interfacing locally to a caller subscribing to the present service.

FIG. 7 is a flowchart for explaining internal and external forwarding of fax transmissions in accordance with this invention, where the Internet is shown as a representative network for external forwarding.

FIGS. 8a and 8b together constitute a flowchart for explaining delivery of forwarded transmissions to called sites.

DETAILED DESCRIPTION

Figure 1:
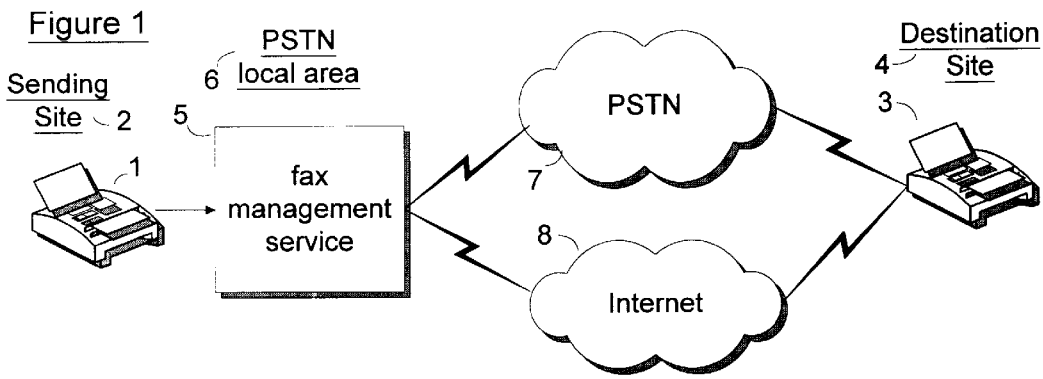
FIG. 1 is a schematic of a network environment suited for application of the present invention.

FIG. 1 is used to explain differences between presently conventional handling of fax transmissions in the PSTN and the enhanced fax transfer service contemplated by our invention.

In presently conventional PSTN handling of fax transmissions, a direct connection through the PSTN is established between analog equipment 1 at a sending site 2 and analog equipment 3 at a destination/receiving site 4. This connection is formed in response to a conventional direct dialing sequence at the sending site (i.e. the dialing of a telephone number exclusive to the receiving site). Therefore, the connection is contingent upon a connection route through the PSTN being available, and receiving equipment at the destination being active (powered on) and accessible (not busy with other functions). If a connection can not be made, a busy signal or other indication is returned to the sending site, and the dialing process must be repeated. If a connection can be made, the sending site is signalled and transmits facsimile image information through the connection in conventional analog form. If the connection is broken prematurely or the receiving equipment becomes inoperative during the transfer, the entire dialing, connection and image transmission process must be repeated.

This procedure is grossly inefficient, even if the destination number is "memorized" at the sending site and redialed automatically, since it may deter or delay other telephone activities at the sending site until the desired fax transfer is successfully concluded. This procedure is also rather restrictive inasmuch as each transmission is routable only through internal switching centers and transmission lines of the PSTN.

One aspect of the fax handling service presently contemplated is that it avoids the need for repetitive sending-site operations by having each fax call from equipment subscribed to this service intercepted and recorded locally, and then completed offline to the sending equipment (i.e. completed after disconnection of the sending equipment from the local telephone exchange at which the interception is effected). Another aspect of the presently contemplated service is that it can avoid the internal routing restrictions of comparable presently conventional services.

For calls subscribed to the presently contemplated service, handling of the transfer between sites 2 and 4 is determined by a facsimile management service 5, within a PSTN local area 6 serving sending site 2. Management service 5 records the dialed sequence and the image information, and operates off-line to the sending site to select one of several possible routes for the facsimile transfer to the receiving site. The selectable routes include internal routes 7 through the PSTN and external routes 8 through data networks such as the Internet.

In a preferred embodiment, management service 5 acts to intercept calls originating from sites subscribed to the presently contemplated service, to store signals representing both the dialed sequence corresponding to the destination telephone number and the facsimile information to be transferred to the destination, and to manage transfer of the facsimile information to the destination offline to the sending equipment. Thus, if sending site 2 is subscribed to this service, equipment 1 is given the appearance of the direct dialed destination being virtually available, regardless of the state of the destination (busy/idle) at the time the call is made, and the further appearance that its fax image intelligence is successfully being transmitted even though the transfer process is or may be incomplete when equipment 1 disconnects.

When an internal route 7 is selected, management service 5 forwards the recorded signals to a telephone system exchange serving the destination site. Typically, the forwarded signals are sent in digital form over an internal data network maintained by the PSTN; e.g. over a digital trunk carrier facility such as T1 (wherein the signals are "digital" in the sense of sampled analog bits, not in the sense of "data"). As allowable rules and tariffs evolve for this type of service, the signals also could be sent as data over local area networks (LANs) or wide area networks (WANs) linking the management service and the respective telephone system exchange. At the respective destination exchange, the forwarded signals are recorded, a connection is made to the destination site, and the fax image signals are forwarded to that site. The forwarded signals are converted to analog form if necessary, depending upon characteristics of the receiving equipment 3.

Connection to the destination site may be be effected by standard ringing and response procedures, or by other procedures if appropriate. The standard response procedure may include allowance for re-ringing sites that are either busy with other calls or unprepared for fax reception (e.g. sites having their reception equipment powered off, or unloaded with paper if paper copy is the default medium of reception, etc.).

When an external route is selected, management service 5 interacts with a not-shown data server to link to the external network/Internet 8 on which the communication is to be forwarded.

This server directs the communication to an address on the external network from which the destination equipment may be reached. This address can be either: 1) an address (e.g. an Internet URL) assigned to a server in the external network which can directly link to the destination equipment; or 2) an address or URL assigned to a PSTN server linked to a telephone system exchange serving the called destination number. When the address is that of a server directly connectable to the destination equipment, it is understood that the destination equipment is then a digital computer or the like capable of receiving the communication in digital form and reproducing the transferred image therefrom. When the address is that of a server within the PSTN, the destination equipment may be either conventional analog facsimile receiving equipment or a digital computer.

In accordance with the invention, the management service's selection between internal and external routing can be based e.g. upon: 1) a user/profile (database) pre-established for users of equipment 1; 2) the telephone number representing the direct dialed destination 4; or 3) a combination of factors including a user profile and the destination telephone number. Thus, for example, a user profile may dictate that facsimile calls from site 2 to a destination local to site 2 should be forwarded through a conventional internal connection of the PSTN, and that facsimile calls from site 2 to a destination remote from site 2 should be forwarded through the Internet. As another example, a user profile may dictate that calls to local destinations and certain remote destinations should be forwarded over internal PSTN routes, and calls to other remote destinations should be forwarded over the Internet.

Figure 1A:
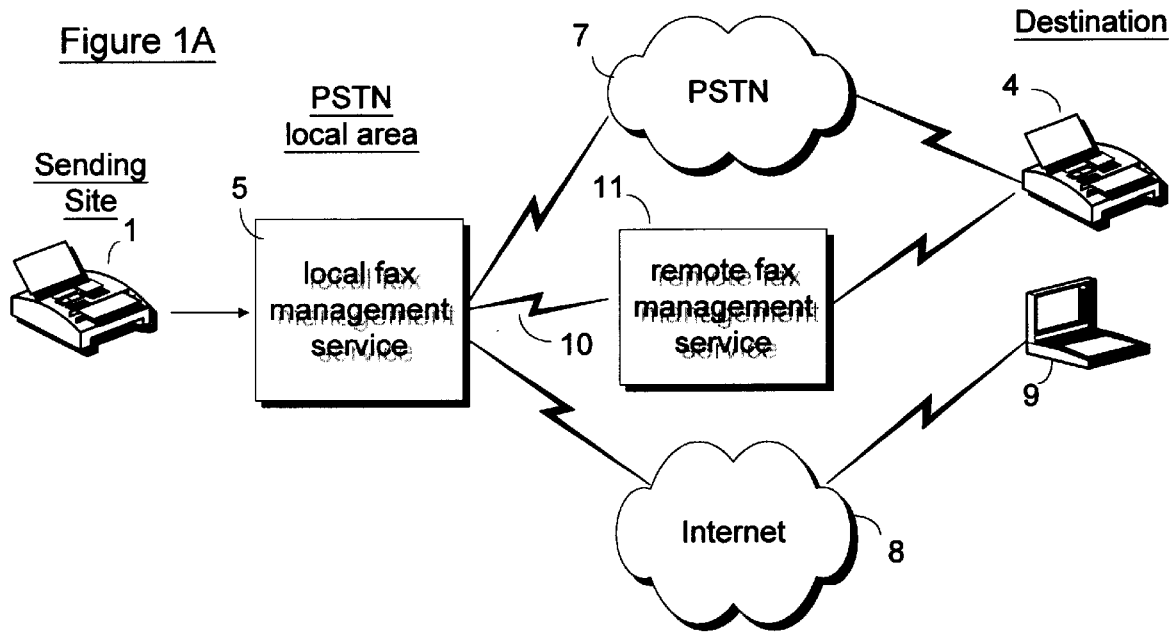
FIG. 1A shows an extension of the network environment of FIG. 1 also suited to application of the present invention.

FIG. 1A suggests additional route selection possibilities and details for the service application of this invention. As shown here, local fax management service 5 can select between three possible forwarding routes: a) an internal PSTN route 7 extending to conventional (e.g. standard analog) facsimile receiving equipment 4; b) an external data route 8 (e.g. the Internet) linking directly to a digital computer 9 at the destination site; and c) an internal digital route 10 within the PSTN (e.g. a digital trunk carrier system such as Ti, although as allowable rules and tariffs evolve, they could be sent over a LAN or WAN) linking to a remote fax management service application 11 which carries out the forwarding process relative to equipment 4.

Figure 2:
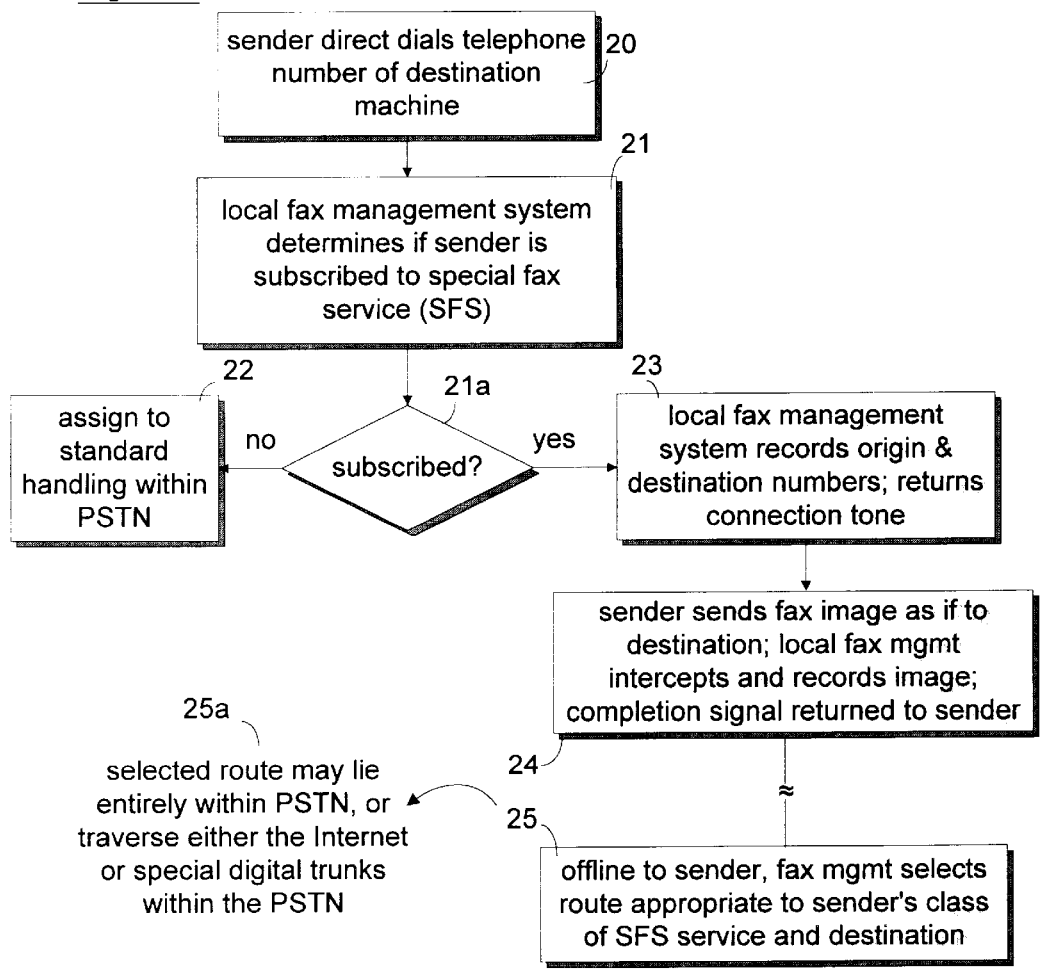
FIG. 2 is a flow diagram indicating a preferred implementation of the present invention in a broad general context.

Details of the foregoing activities are indicated in the flow diagram of FIG. 2. In response to direct dialing (or tone keying) of a telephone number representing the destination of a facsimile transmission call (operation 20), a local service management system (described in greater detail later) determines (operations 21, 21*a*) if the call is from a site subscribed to the "special fax service" of the invention (abbreviated as "SFS"), and, for calls that are subscribed to this service, manages the recording and off-line forwarding functions characteristic of this service.

The local management service distinguishes between outgoing fax calls and outgoing voice telephone calls in a presently conventional manner. Each line carrying a call is identified by a calling line identity (CLID) function assigned to the line. If the respective line is used exclusively for fax functions that usage is directly associated with the line's CLID. If the line is used for both voice and fax, its current usage may be distinguished by presently standard methods.

For example, if a voice call is being made from either a "fax phone" (a voice telephone set integral to a standard fax machine), or a conventional telephone connected to a line whose CLID has primary association with fax calls, use of a dialed escape code such "*45" could have the effect of indicating to the local PSTN exchange (or its service management intelligence) that a voice call is being made.

For a fax call, the fax management service determines if the call is or is not originating from a site subscribed to the subject SFS service; e.g. through reference to a data profile of the calling site.

If the sending equipment is not subscribed to SFS service, the call is assigned to standard handling within the PSTN (operation 22), wherein a direct telephone connection is made between the sending equipment and receiving equipment at the dialed destination number, when the latter number is not busy and the receiving equipment at that number is ready to receive.

If the sending equipment is subscribed to SFS service, the call is handled by a fax management service application associated with the local telephone exchange receiving the call, that service application performing operations 23 through 25.

In operation 23 the service application records information representing the telephone numbers of the originating equipment and the direct dialed destination, and acts to have a "connection tone" returned to the originating equipment. Those skilled in the art will appreciate that this connection tone is specified by international standards, such as the International Telecommunications Union T.30, and that its effect is to cause the originating equipment to send signals representing the facsimile image intelligence. As suggested at 24, this process concludes with the service application acting to have a completion signal returned to the sending equipment. Then, in operations 25 conducted offline to the sending equipment, the management service acts to select a forwarding route appropriate to the subscriber's class of SFS service and profile, and the dialed destination. As noted at 25*a*, the selected forwarding route may consist of conventional transmission paths internal to the PSTN, or traverse a data network external to the PSTN (e.g. the Internet) or traverse special digital trunks internal to the PSTN.

Figure 3:
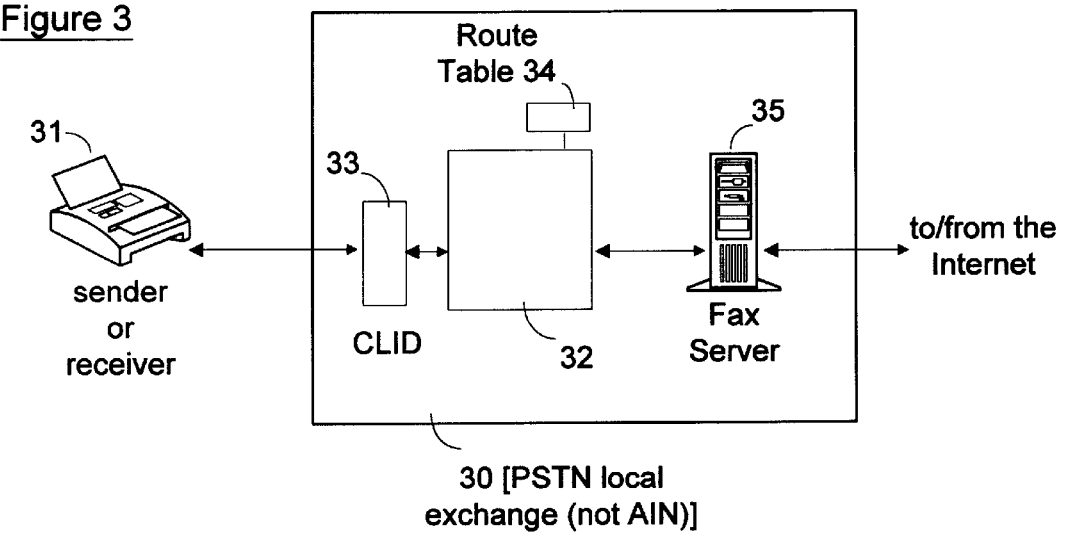
FIG. 3 is a block diagram of an implementation of the invention in a telephone network environment lacking the sophisticated computer intelligence associated with AIN architecture.
Figure 4:
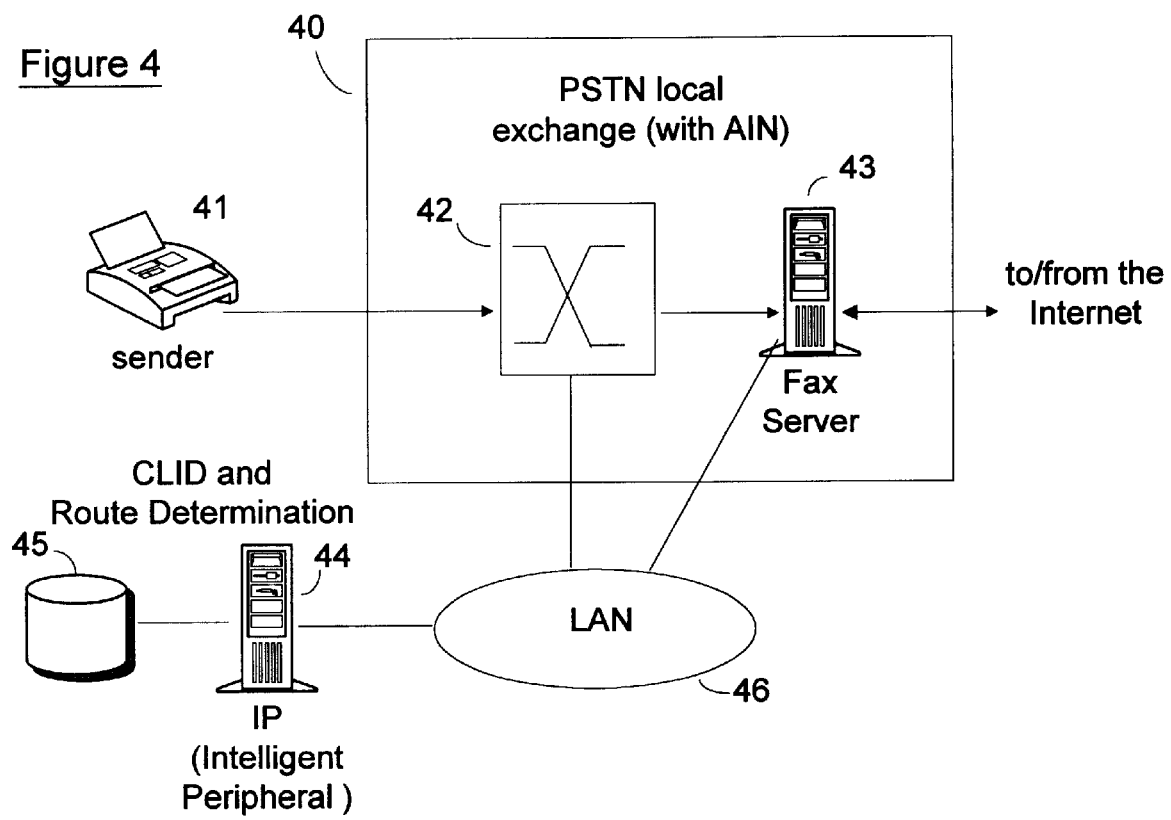
FIG. 4 is a block diagram of an implementation of the invention in a telephone network environment containing AIN intelligence.
Figure 5:
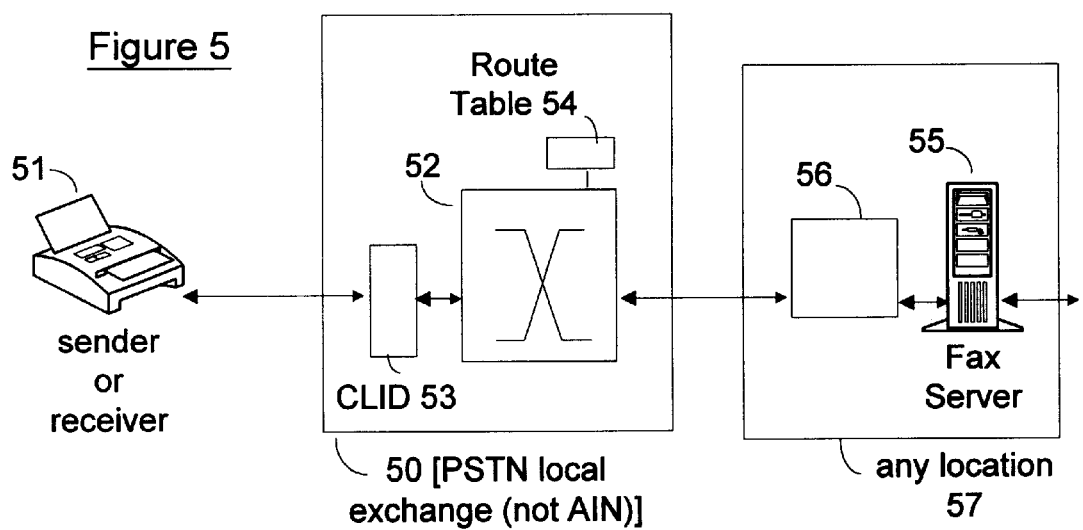
FIG. 5 is a block diagram of an alternate implementation, showing how the fax server seen in FIGS. 3 and 4 could be physically remote from a local telephone network exchange handling a call.

FIGS. 3–5 depict different PSTN methods for handling presently contemplated SFS type services.

FIG. 3 shows a telephone system exchange 30, providing local telephone connection services to fax (sending and/or receiving) equipment 31 through a switching complex 32; wherein the exchange is not equipped for operating in an AIN (advanced intelligent network) architecture environment. In this type of exchange, calling line usage identification and call routing functions are performed respectively by CLID apparatus 33 and call routing table 34 directly associated with switch 32. CLID and routing table functions are inherent but unstandardized parts of presently conventional telephone switches (unstandardized being used here to connote that implementations of these functions may differ for switches made by different manufacturers). As shown here, the switch connects to fax server 35 interfacing between the local exchange and an external network such as the Internet. Not shown connections between the switch and internal trunks of the PSTN allow for internal routing of calls between the local exchange and other PSTN exchanges. Other not shown switch connections allow for direct local transfer of calls through the switch, between equipment 31 and other user/customer sites locally served by exchange 30. Thus, exchange 30 can be adapted to recognize outgoing fax calls originating at equipment 31, via operation of CLID apparatus 33, and determine if such calls are entitled to the presently contemplated SFS service, again by considering user parameters associated with the line identified by apparatus 33.

Furthermore, exchange 30 can be adapted to selectively route outgoing fax calls that are subscribed to the present SFS service either internally within the PSTN, through internal trunk and/or local line connections to switch 32, or externally through apparatus such as fax server 35.

In this type of configuration, the preferred operation for external routing of subscribed fax calls would be to record the (direct dialed) destination and fax image signal intelligence in server 35 and have the latter complete the forwarding of the recorded information to the dialed destination. For internal routing, the preferred operation would be the same as for external routing, except that the fax server 35 would dial the far end server rather than send a data message through the external network.

FIG. 4 shows a telephone system exchange 40, providing local telephone connection services to fax (sending and/or receiving) equipment 41 through a switching complex 42; wherein the exchange is adapted for operation in an AIN environment. For present SFS services, a fax server 43 provides connectivity between switch complex 42 and an external network such as the Internet, and calling line identification and call routing functions can be performed by an intelligent peripheral (IP) computer system 44 (of the type described in the Acker et al copending patent application referenced earlier) having an associated referential database 45 and connections to switch 42 and fax server 43. Alternatively, in a more traditional type of AIN implementation, the routing information to the switch complex can be transferred from a service control point (SCP) via a signalling link using an SS#7 protocol. As shown here, communications between the IP system and the switch and server can be conducted through an internal LAN (local area network) 46. Thus, the IP system need not be located at the same physical site as elements 42 and 43.

As in FIG. 3, not shown connections between the switch and internal trunks of the PSTN allow for internal routing of calls between the local exchange and other PSTN exchanges, and other not shown switch connections allow for transfer of calls through the switch, between equipment 41 and other user/customer sites locally served by exchange 40. Thus, IP system 44 can be adapted (via application software and communications over LAN 46) to recognize outgoing fax calls originating at equipment 41, determine if such calls are entitled to the presently contemplated SFS service, by considering use profile information in database 45, and selectively establish a forwarding route for each call that is either internal to the PSTN or runs through server 43 and the external network. In this configuration, the IP system stores all of the call information for each call subscribed to SFS service (dialed destination and fax image intelligence) and operates either as an originating station in an internal forwarding process or to transfer the information to a PSTN fax server such as 43 for external forwarding. Furthermore, in this type of environment, the determination of the forwarding route to be assigned to apparatus 41 can be variably profiled to be: 1) always internal; 2) always external; or 3) either internal or external depending upon current call parameters such as the dialed destination or special escape codes.

FIG. 5 shows an alternate to the environment of FIG. 3 for explaining how the fax server and local exchange seen in the latter figure can be located physically separate from each other (in for example physically separate and mutually remote buildings). In FIG. 5, telephone system exchange 50 at a given site (e.g. a specific room in a building) provides local telephone services to fax equipment 51 through a switching complex 52, the latter having associated CLID apparatus 53 and route table apparatus 54. Fax server 55 and communication equipment 56, which interface between the switching complex and an external network such as the Internet, are at a site physically separate from that of the exchange 50 (e.g. a different room in the same building, or in another building either near to or remote from the exchange site. Communication equipment 56 may be implemented as a conventional Data Service Unit/Channel Service Unit (DSU/CSU), or with an IBM 9295 Multiple Voice Server.

As in FIG. 3, not shown connections between the switch and internal trunks of the PSTN allow for internal routing of calls between the local exchange and other PSTN exchanges, and other not shown switch connections allow for transfer of calls through the switch, between equipment 51 and other user/customer sites locally served by exchange 50. Thus, with suitable adaptations of exchange 50, for providing present SFS services and for effecting data communications between fax server 55 and exchange 50, this configuration can provide selective routing of fax calls from apparatus 51 to direct dialed fax receiving sites via either exclusively internal facilities of the PSTN or the external network linked to fax server 55.

Those skilled in the relevant arts will readily appreciate that a similar variation may be applied to the configuration of FIG. 4 for allowing placement of its fax server remote from both the local exchange and the IP system of that figure.

Operations performed by call management and fax server systems of the PSTN for delivery of the present service are described with reference to flowcharts in FIGS. 6, 7, 8a and 8b.

FIG. 6 is used to explain local handling of fax calls from PSTN user sites subscribed to the presently contemplated service. As indicated at 70, a subscribed calling site—typically, a site using a standard analog fax machine—performs the standard operation of direct dialing the telephone number of the intended recipient of a fax transmission. As shown at 71, the local telephone company (telco) office managing telephone call switching in a local area including the calling site recognizes this call as originating at a site subscribed to this service, and checks the subscriber's profile, in a storage database available to that office, for restrictions pertaining to calls to the dialed destination. This results in the decision shown at 72. If the profile does not allow this particular call a "denial of service" tone is returned to the calling site (block 73) and the caller is disconnected. If the profile allows handling of this call, operations 74–76 are performed.

In operations 74, the called number is stored and a "fax tone" is returned to the calling site signalling the latter to transmit its fax image data. In operations 75, the image data is received from the calling site and stored in digital form. Operations 76, performed following completion of the image transfer, effect disconnection of the calling site initiate the forwarding process. In operations 75, the speed of data transmission and error handling, between the telco local system and the calling site, depend upon the capabilities of the calling machine, and the fax server of the local system (e.g. 35 FIG. 3, 43 FIG. 4, etc.) acts as the called destination.

FIG. 7 is used to explain the forwarding process performed by the local telco system. In these operations, the local system's fax server is the originating component of the forwarding system. As shown at 80 and 81, this server uses the calling site's database profile and local telco system default rules to select a forwarding route. To effect this selection, the server interacts with local call management intelligence; e.g. an intelligent processor IP of the type disclosed in the above-referenced copending patent application by Acker et al or intelligence internal to the local switching office. If a route is not explicitly defined by the caller's profile (negative decision at 81), a route is selected in accordance with default rules locally applicable to this type of service (e.g. rules requiring forwarding to local destinations only through local analog switches and lines of the PSTN) as shown at 82, and the forwarding process continues with operations shown at 83 and 84. In operations 83 a message is sent to the "far end" fax server (the server responsible for delivery of the image data to the called site). This message is in digital form and contains the called telephone number and the fax image data. In operations 84, the forwarding process concludes with reportage of billing details to the local system responsible for subscriber billing. Although not pertinent to the present invention, it is noted that the fax transfer service presently contemplated could be billed to a calling site, a called site or partially to each site, depending upon procedures developed by the PSTN.

If a "yes"/positive decision is made at 81, a further determination 85 is required for selecting between forwarding procedures applicable to local and non-local (long distance) call destinations. If the destination is local, operations 86, 87 and 84 are performed successively, whereas if the destination is not local, functions indicated at 88 through 92, plus operations 83 and 84 are used.

In local forwarding operation 86, the called number is re-dialed through a local telco switch (by interaction of the fax server, local call management intelligence, and switchgear). In operation 87, the fax image data is sent directly to the called site in analog form, and this is followed by the billing reportage function 84 noted earlier. Conventional telco procedures apply here; i.e. if the called site is busy or doesn't answer, it is dialed repeatedly (operation 86 is repeated) until it is answered.

Non-local forwarding operations begin with determining (decision 88) if the far end server (the server responsible for delivery of the image data to the called site) is available. The far end server may be unavailable either when the far end is off-line due to a problem, or if the router profile assumed a call would be delivered to a location that does not have a server.

If the far end server is unavailable ("no" decision at 88), operation 89 is performed to direct dial the called site through the PSTN, and, when a connection to that site is made (when the called site answers the call), operations 87 and 84 are performed to respectively transfer the image data (in analog form) and report billing information.

If the far end server for non-local transfer is available ("yes" determination at 88), determination 90 is required to define the basis for route selection as either the calling site's profile or local telco defaults. If the basis is the calling site's profile, operation 91 is performed to select a route appropriate to that profile, and otherwise operation 92 is performed to select a route based on local telco defaults. Using the route selected either by operation 91 or operation 92, the message transfer function of operation 83 is performed as described previously followed by the billing reportage function of operation 84.

FIGS. 8a and 8b together form a flowchart for explaining the process for delivering fax images under the present service to called sites which may not be directly accessible through the PSTN; e.g. for delivery to digital computers via the Internet.

As shown at 100, this process begins at the near end server with a route determination based on either the calling site's subscription profile or local telco defaults applicable to that site. As shown at 101, an exemplary determination is indicated, based on site profile, that the called destination requires delivery to a digital computer via an external network (a network external to the PSTN) such as the Internet. Based on this determination, a further determination is made (decision 103) to effect delivery either in an e-mail form or some other form (e.g. as a direct communication to an Internet URL if the called site has such usage).

If the decision is made to deliver the fax image data as Internet (or Intranet) e-mail, operations 104 to 106 are performed in succession, and otherwise processes shown in FIG. 8b are evoked as indicated by the circled symbol "a" at 109a.

When e-mail delivery to a given call destination is indicated an e-mail address is associated with that destination's telephone number (in the calling site's profile), and an e-mail message is routed to that address by the fax server local to the calling site (operations 104 and 105). This message, which is effectively routed to an Internet access provider or other entity through which the called site receives its e-mail, contains the fax image data received from the calling site. The image data may be in the form either of an attachment to an e-mail note from the caller (a note generated by the local call management system with the sender identified on it) or as an integral part of an e-mail note (operation 104). After the message has been sent (operation 105), the forwarding process ends with reportage of billing information (operation 106).

If delivery is not by e-mail ("no" decision at 103) operations shown in FIG. 8b are evoked through linkage between the circled "a" at 109a in FIG. 8a and the same symbol appearing at 109b in FIG. 8b.

In this circumstance, it is first decided (decision 110) if the call destination is local or not local in relation to the calling site. If the destination is local, operations 111–113 are performed in succession, whereas if the destination is not local a process involving selected ones of functions 114–124 is performed.

In a local transfer, operation 111 is used to ring and eventually connect to the called site through lines and switches of the PSTN that are local to the caller and internal to the PSTN. Naturally, if the called site is busy or does not answer it is rung repeatedly until it does answer. When connection is made to the called site, the fax image data is sent over that connection in standard analog form (operation 112) and when this is finished the process concludes with reportage of billing information (operation 113).

Handling of non-local transfers begins with a determination (decision 114) of the availability of the far-end server (the telco fax server serving the telco office local to the called site). If (for reasons cited earlier) the far end server is unavailable, operation 115 is performed to directly dial and ring the called site via internal lines and switches of the PSTN. If the called site does not respond, operation 115 is repeated until the site answers its ring. When the called site answers, a connection for fax transfer is established and the fax image data is transferred over that connection in analog form (operation 112). At completion of this transfer, the process concludes with reportage of billing information (operation 113).

If the far end server is available, when determination 114 is made, a process is initiated that begins with decision 116 and concludes with operation 122. In decision 116 it is determined if the calling site's profile designates special routing (e.g. routing as e-mail, other routing through external networks, etc.). If special routing is not specified in the caller's profile, a route is selected in accordance with local telco defaults (operation 117) and a digital message is sent via that route to the far end telco fax server for the local area containing the called site (operation 118). This message includes the telephone number of the called site and the fax image data.

The far end server receiving this message stores it, and checks the profile of the called site for determining how to complete delivery (operation 119); e.g. for determining (decision 120) whether to handle delivery as a conventional PSTN fax transmission or via external e-mail. If conventional internal PSTN handling is preferred ("no" determination at 120), operations 121 are performed to connect to the called site via internal elements of the PSTN and deliver the fax image information in analog form, and when that is finished the process concludes with reportage of billing information (operation 122).

If e-mail delivery is preferred ("yes" determination at 120) operations 104–106 shown in FIG. 8a, and described previously, are invoked via the linkage represented by the circled "b" at 120a in FIG. 8b) and the same symbol at 120b in FIG. 8a.

In accordance with the foregoing, the following claims are made.

We claim:

1. An extended service application for handling facsimile (fax) transmissions over the public switched telephone network (PSTN), wherein said transmissions originate at standard analog devices, as telephone calls direct dialed to destination equipment intended to be the ultimate receivers of the respective transmissions; said extended service application comprising:

at local telephone system exchanges initially handling said fax transmissions, detecting fax transmissions originating at equipment subscribed to said extended service application;

in response to detection of a said fax transmission originating at equipment subscribed to said extended service application, interacting with the respective subscribed equipment to cause the respective subscribed equipment to complete its respective fax transmission, without an actual connection being made to the direct dialed destination of the respective transmission but with the appearance to the respective subscribed equipment of such a connection having been made;

at said initially handling telephone system exchanges, interacting with said respective subscribed equipment, recording signals representing said respective fax transmission and the respective direct dialed destination thereof, and providing a concluding indication effectively severing the connection between the respective interacting exchange and subscribed equipment;

at said initially handling exchanges, conducting operations after severing of said connections to said subscribed equipment to forward said recorded signals to said direct dialed destination; and in a said forwarding operation, initiated at a said initially handling exchange, selectively converting said recorded signals representing a respective said transmission and destination thereof to a digital format and transferring said converted signals in said digital format to a digital data network which is external to said PSTN and not subject to being controlled by the respective initially handling telephone exchange.

2. An extended fax service application in accordance with claim 1 wherein said operation of forwarding said recorded signals to said direct dialed destination includes:

forwarding said recorded signals to a selected one of first and second types of routes, wherein said first routes are entirely internal to said PSTN and said second routes are at least partly external to said PSTN; and wherein at least a portion of each said second route extends through a said digital data network external to said PSTN.

3. An extended fax service application in accordance with claim 2 wherein said digital data network external to said PSTN is contained in a public data network, and wherein said recorded signals, when forwarded to said public data network, are transferred in a digital format commonly used on said public data network.

4. An extended fax service application in accordance with claim 3 wherein said public data network is the Internet.

5. An extended fax service application in accordance with claim 3 wherein said public data network links to facsimile receiving equipment at said direct dialed destination through a direct connection from said data network to said receiving equipment.

6. An extended fax service application in accordance with claim 3 wherein said public data network links to facsimile receiving equipment at said direct dialed destination through an indirect connection from said data network to said receiving equipment: said indirect connection extending through said PSTN; and wherein said signals representing said fax transmission are required to be converted from digital to analog form in transit over said indirect connection.

7. An extended fax service application in accordance with claim 2 wherein said first route includes a switching exchange within said PSTN that links directly to facsimile receiving equipment at said direct dialed destination.

8. An extended fax service application in accordance with claim 7 including:

at a said exchange linking directly to said direct dialed destination, operating to receive said recorded signals forwarded from said initially handling exchanges, and to deliver fax image intelligence contained in said recorded signals to said destination by means of signals presented to said destination in a selectively predetermined one of two forms associated with characteristics of reception equipment located at said destination; said two forms being an analog form and a digital form.

9. An extended fax service application in accordance with claim 8 wherein said signals presented to said destination in said digital form are configured as telephonic fax transmissions analogous to signals presented in analog fax transfers.

10. An extended fax service application in accordance with claim 8 wherein said signals presented to said destination in said digital form are configured in a form analogous to standard presentations of e-mail for reception by computer systems at said destinations.

11. An extended fax service in accordance with claim 7 including:

at said exchange that links directly to facsimile receiving equipment at said destination, receiving forwarded fax transmissions forwarded by said initially handling exchanges in a first standardized signal format, converting said received transmissions to a second standardized signal format different from said first format, and forwarding said converted transmissions to said facsimile receiving equipment at said destination in said second standardized format.

* * * * *